United States Patent [19]
Sato

[11] Patent Number: 5,182,134
[45] Date of Patent: Jan. 26, 1993

[54] RADIO FREQUENCY CURE OF THERMOSET-RECEPTOR COMPOSITIONS

[75] Inventor: Norman J. Sato, Maple Grove, Minn.

[73] Assignee: H. B. Fuller Licensing & Financing Inc., Wilmington, Del.

[21] Appl. No.: 826,620

[22] Filed: Jan. 28, 1992

Related U.S. Application Data

[62] Division of Ser. No. 619,248, Nov. 28, 1990, abandoned.

[51] Int. Cl.$^5$ .............................................. B05D 3/02
[52] U.S. Cl. .................. 427/543; 156/273.3; 156/273.9; 156/275.5; 156/275.7; 427/58; 427/388.1; 427/391; 427/393; 427/387
[58] Field of Search .............. 427/45.1, 58, 385.4, 427/387.7, 388.1, 391, 393; 156/273.3, 273.9, 275.5, 275.7

[56] References Cited

U.S. PATENT DOCUMENTS 3,936,412 2/1976 Rocholl .................................. 260/37
4,423,191 12/1983 Haven et al. .......................... 525/169

FOREIGN PATENT DOCUMENTS

60-170552 9/1985 Japan.
988414 4/1965 United Kingdom.

Primary Examiner—Bernard Pianalto
Attorney, Agent, or Firm—Merchant, Gould, Smith, Edell, Welter & Schmidt

[57] ABSTRACT

A method of forming a cured thermoset composition by applying radio signals having a frequency of about 1 to 100 MHz to a composition comprising a major portion of thermoset and a receptor, said receptor having a dissipation factor of about 0.1 or greater and a dielectric constant of at least 0.1 or greater, said receptor selected from the group consisting of alkali or alkaline earth metal sulfate salts, aluminum trihydrate, quaternary ammonium salts, phosphonate compounds, phosphate compounds, polystyrene sulfonate sodium salts or mixtures thereof, said method comprising the steps of:
(a) applying said composition to a substrate;
(b) applying radio signals to the composition deposited on the substrate; and
(c) dissipating the radio signals received by the receptor as thermal energy in an amount effective to cure the composition to a thermoset bond.

21 Claims, 2 Drawing Sheets

RADIO FREQUENCY CURE OF THERMOSET-RECEPTOR COMPOSITIONS

This is a division of application Ser. No. 619,248, filed Nov. 28, 1990, abandoned.

FIELD OF THE INVENTION

The invention generally relates to compositions and methods for curing thermoset compositions. More specifically, the present invention relates to compositions and methods for the curing of thermoset compositions through the application of electromagnetic radiation having frequency in the radio spectrum to receptors which upon activation generate heat at the location of the receptor. The compositions and methods of the present invention are useful in the creation of adhesive bonds, films, and fiber-resin composites suitable for many applications in various industries including the general adhesive application, automobile industry, the aircraft industry and the like.

BACKGROUND OF THE INVENTION

One of the first applications of using radio waves to produce heat was in the area of medical diathermy or the heating of muscle and skin tissue by radio waves. Radio waves were used in this context for the treatment of arthritis at the beginning of the century. In the adhesives industry, the first radio frequency cure application with water based adhesives dates back to the late 1930's in the lumber industry. At this time, boards were being pressed with steam heated platens into plywood sheets. Veneers were being hot pressed into curved shapes with hand tool metal molds. Switching to radio frequency heating equipment saved money, time, energy and materials, by eliminating the steam platens. This new technology was immediately accepted by the wood working industry.

The rapid radio frequency cure of plywood was invaluable during World War II. Examples of applications for radio frequency cured water based adhesives in plywood products include the P.T. boat and the British mosquito bomber airplanes. The radio frequency cure industry continued to grow rapidly in the 1950's. The wood and lumber industries converted more and more to radio frequency. Plastic welders, heat sealers and thermoplastic preheaters were developed. Rubber vulcanizing systems and compression molding techniques for the tire industry were also developed.

A representative sample of the present state of the art includes Haven et al, U.S. Pat. No. 4,423,191, which teaches the curing of thermoset resins such as polyurethanes, phenolics, polyesters, and epoxies through the use of dielectrically lossy particles and with the application of an electric field having a frequency ranging from 1 MHz to 30 MHz and preferably about 1 MHz to 100 MHz.

Wilkinson et al, U.S. Pat. No. 4,941,936, disclose a process for using dielectric heating in the manufacture of reinforced plastic automotive body parts. Thorsrud et al, U.S. Pat. No. 4,360,607, discloses a sensitizing concentrate generally comprising four constituents including (1) polymeric alkylene glycols and their mono- and di-alkyl ethers, (2) alcohol amines and their hydrocarbyl substituted derivatives, and optionally, (3) silica, and (4) a "plastomer", i.e., an elastomer such as a butadiene-styrene copolymeric rubber. Thorsrud, U.S. Pat. Nos. 4,661,299, 4,767,799 and 4,790,965, discloses compositions intended to enhance the radio frequency sensitivity of moldable compositions such as zinc oxide, bentonite clay, and crystalline or amorphous alkali or alkaline earth metal aluminsilicate. Thorsrud, U.S. Pat. No. 4,840,758, discloses a method for preparing molded thermoplastic articles including the steps of admixing a radio frequency energy sensitizing agent, namely, N-ethyl toluene sulfonamide into a thermoplastic polymer to provide a mixture having moldable consistency. Generally, the radio frequency sensitizer is activated at 100 MHz and used in a concentration ranging from 2 to 15% of the weight of the polymer.

Pham et al, U.S. Pat. No. 4,853,420, discloses polymers which are readily susceptible to high frequency radiation, from about 0.1 to about 30,000 MHz as a means of heating these thermoplastic polymers to a pliable consistency. Beckert et al, U.S. Pat. No. 4,296,294, disclose a mechanism for drying aqueous based adhesives based on varying the energy in a radio frequency field to effectively promote the evaporation of water from the adhesive used in bookbindings. Schonfeld et al, U.S. Pat. No. 4,083,901, disclose a process for curing polyurethane elastomers using a curing agent.

Toa Gosei Chem Ind. Ltd., Japanese Patent No. 2,086,672, discloses an adhesive complex comprising polypropylene which optionally may contain an ethylene-propylene copolymer, an alpha, beta ethylenically unsaturated carboxylic acid or its anhydride, a radical initiator, and an fine particle. Maeda et al, U.K. Patent Application 2,200,128A, discloses a polyphenylene oxide resin composition suitable for high temperature dielectric applications. Gauvin et al, "Forging and R-F Assisted Processing of UHMW Polyethylene, Two Alternatives for Shorter Cycles and High Performance", disclose a comparison between radio frequency assisted processing and forging processing of thermoplastic compositions.

Radio frequency has been applied to various other adhesives with little or no commercial success. Urethanes, resin composites, epoxies, dental acrylics, and epoxy adhesives, were all subjected to experimentation of radio frequency cure. Moreover, polyesters, silicons, polyolefins generally, polystyrene, polyvinylchloride, acrylics, polycarbonates, urethanes, generally epoxies, fiberglass, are among those compounds that are not sensitive to radio frequency energy. The use of radio frequency to cure solely the adhesive composition generally failed due to a lack of appropriate equipment as well as an absence of appropriate electrical and chemical properties in the materials to be cured.

SUMMARY OF THE INVENTION

The present invention provides compositions and processes which may be used to cure thermoset compositions on demand at a substantial savings in costs. The compositions and methods of the present invention provide heat curing of thermoset compositions within the localized volume having an effective concentration of the radio frequency receptor is located. As a result, not only is unnecessary heating of the surrounding environment avoided, but moreover, substrates with a low melt point or even flammable substrates as well as resins may be left substantially unaffected by processing. The compositions and methods of the present invention reduce heat distortion, warpage, or "read through" on the substrates of application. The bond line is the sole situs of heat and not the substrate. Rather the substrate acts as a heat sink.

The system of the present invention places a RF curable composition between a source of RF energy and a conductive surface. The RF energy passes from the source through the RF curable composition to the conductive surface. The RF source can be an antenna (plate), conductive substrate or other RF source. The conductive surface (receive surface) can be an antenna (plate), conductive substrate or any effective RF receptor. The RF in cooperation with the receptor cures the thermoset on demand at a lower cost in materials as well as power consumption. The composition of the present invention is capable of curing thermoset compositions having a higher cure temperature than the melting point or heat distortion temperature of the substrate to which they are applied due to the localized activation of the thermoset through the radio frequency receptor. Moreover, methods and compositions of the present invention provide a means of curing thermoset compositions regardless of the thickness or the polarity of the substrates.

The present invention resides in part in a thermoset receptor for radio signals having a frequency of about 1 to 100 MHz. The receptor of this invention has a dissipation factor of about 0.1 or greater. The present invention also comprises heat curable films, adhesive compositions, and composites. Methods of curing thermoset compositions through the application of radio signals having a frequency of about 1 to 100 MHz to compositions having a receptor where the substrate of application can be used to transmit the activating energy to the receptor laden composition.

DETAILED DESCRIPTION OF THE INVENTION

The present invention comprises a radio frequency receptor, compositions including a thermoset and a radio frequency receptor, and methods of curing thermoset compositions using a radio frequency receptor.

Receptors

Generally, the receptors of the present invention function to absorb radio waves transmitted through receptor laden curable composition. By absorbing the radio waves, the receptors, in turn, transform radio energy into heat energy thereby promoting the curing of thermoset compositions. Previously, radio frequency work has focused on the dielectric constant of various receptor compositions. However, I have found that in the relationship of dielectric constant, loss tangent, and dielectric loss factor, both loss tangent and dielectric loss factor have a significant impact on the system. Dielectric constant is related to loss tangent and dielectric loss factor by the following equation:

Dielectric loss factor = Dielectric
Constant = Dissipation Factor

The dielectric constant is a measure of the energy storage capability of the material. The Dissipation Factor is the ratio of the energy dissipation (or loss) capability of the material to its energy storage capability. In previous instances, the primary focus has been upon dielectric constant, i.e. the ability of the material to accept and store charge. However, important to a receptor composition is the ability of that composition to not only absorb and store charge but to also, after some given time, dissipate that charge or lose that charge to the surrounding material.

This dissipation factor or dielectric loss factor is a measure of the ability of the receptor to dissipate energy in the form of heat to the surrounding material. Reliance solely upon dielectric constant may result in a receptor which will store energy continually without any dissipation resulting in poor control over curing.

Generally, compositions useful as receptors in accordance with the present invention include those which have a dissipation factor of at least 0.1 or greater when exposed to radio waves of a frequency of from 1 MHz to 100 MHz. Moreover, the compositions in accordance with the present invention which will most preferably serve as receptors should have a dissipation factor ranging from about 0.1 to over 100, preferably from about 0.1 to about 50, and most preferably from about 0.1 to about 5. Receptors of the present invention may have a dielectric constant ranging from about 0.1 to over 2000.

Examples of receptors which have been found useful in accordance with the present invention are believed to work by way of one of two of the following mechanisms. First, useful receptors ("kinetic receptors") have been found to work through a kinetic mechanism where the addition of a higher concentration of receptor within the thermoset composition results in an increased amount of heat towards that level desired in the specific application.

Receptors useful in the present invention have also been found to work in a complementary manner with the activating radio frequency plate or antenna. Specifically, the more plate or antenna area to which the "complementary receptor" treated composition is exposed, the lower the concentration of receptor is necessary in order to create the amount of desired heat given a fixed distance between plates. In contrast, the lesser area of antenna or plate available to activate the receptor treated composition, the higher the concentration of receptor necessary to treat and create the desired heat. In this capacitive relationship, the amount of energy exposed to the receptor treated composition inversely determines the concentration of receptor necessary within the composition itself.

Generally, any composition having a dielectric constant, dissipation factor and capable of absorbing radio waves as the frequencies detailed above may be used in accordance with the present invention. Compositions which have been found to be most useful in accordance with the present invention include compounds having bound molecular water and compounds without bound molecular water.

Those compounds having bound molecular water include alkali and alkaline earth metal sulfate salts and aluminum trihydrate. Alkali and alkaline earth metal sulfate salts such as calcium sulfate are believed to work through a kinetic mechanism where the concentration of the calcium sulfate is varied based on the amount of heat desired and the composition of use. Generally, the composition of calcium sulfate ranges from about 0.1 wt-% to 40 wt-%, preferably from about 0.1 wt-% to 10 wt-% and most preferably from about 0.1 wt-% to 6 wt-%.

Turning to aluminum trihydrate, this receptor is also believed to also work through a kinetic action wherein the concentration may be varied depending upon the amount of heat to be delivered to the resulting composition. Specifically, the concentration of aluminum trihydrate may vary broadly from about 1.0 wt-% to 60 wt-%, preferably 8 wt-% to 12 wt-%, and is most preferably about 10 wt-%.

Receptors useful in the present invention may also comprise those without bound molecular water such as quaternary ammonium salts, phosphonate compounds, phosphate compounds, and polystyrene sulfonate sodium salt.

The concentration of polystyrene sulfonate sodium salt may be varied depending on the area of the receptor laden substance exposed to the antenna or radio frequency generating plate. Generally, the concentration of polystyrene sulfonate sodium salt may vary from about 0.1 to 20 wt-%, preferably from about 0.3 to 4 wt-% and most preferably from about 0.5 to 2 wt-%.

Other compounds also useful as receptors in accordance with the present invention are phosphate and phosphonate compounds. Generally, phosphate compounds useful in the present invention are those having a large enough dipole character to be receptive to the given frequency of radio waves introduced into the system. Phosphate compounds which may adequately work as receptors include tricresyl phosphate, tributyl phosphate, propylated triphenyl phosphate, and tri ($\beta,\beta$ dichloro isopropyl) phosphate.

Moreover, any phosphonate compound having a phosphate-oxygen bond having enough dipole character to be receptive to the frequency of energy introduced into the system may be useful in accordance with the present invention. Phosphonate compounds which have been found useful in accordance with the present invention include dimethyl methyl phosphonate, trichloropropyl phosphonate, diethyl 2-hydroxy ethyl amino phosphonate, and the like. Generally, the concentration of these compounds will range from about 0.1 wt-% to 25 wt-%, preferably from about 0.5 wt-% to 10 wt-% and most preferably from about 1 wt-% to about 7 wt-%.

Receptors of the present invention may also comprise quaternary ammonium salts such as CA-100 available from Aceto Chemical Co. of New York. Generally, any quaternary ammonium salt having the chemical and electrical properties outlined in this application may be useful in accordance with the present invention. Generally, those quaternary ammonium salts which are though to be most useful are those of the general formula $CH_3CH_2N(CH_3)_2R$ wherein R is a $C_{10}$ to $C_{24}$ branched or linear alkyl. The concentration of the quaternary ammonium salts generally ranges from about 0.1 to 15 wt-%, preferably from about 0.3 to 10 wt-% and most preferably from about 0.5 to 1.5 wt-%.

While the quaternary ammonium salts are generally soluble in the resin, it is often desirable to use plasticizer or reactive diluent to make the salts soluble. In these instances, a diluent or plasticizer may generally be added at the rate of up to 8 parts diluent or plasticizer for every 2 parts quaternary ammonium salt based on the concentrations of quaternary ammonium salts disclosed above. Useful diluents or plasticizer compositions include any composition which will effectively solubilize the quaternary ammonium salt within the given resin such as phosphates and phosphonates, polyols such as 1,4-butanediol ethylene glycol, and propylene glycol, isophthalic resins, orthophthalic resins and 4-toluene sulfonamide-N-ethyl are all examples of compositions which may be useful in plasticizing quaternary ammonium salt receptors of the present invention.

Thermoset Compositions

The receptors of the present invention may be used in any variety of curable thermoset compositions which are capable of being crosslinked or cured through heat. Thermosetting compositions useful in the present invention include epoxies, polyurethanes, curable polyesters, hybrid thermosets, and curable acrylics among a large number of other compositions. Also useful in the present invention are bismaleimides such as the partial reaction product of the bismaleimide of methyl dianiline.

Other curable thermoset composition which also may be useful with the receptors of the present invention include silicons, phenolics, polyamids, and polysulfides, among others. Preferred thermosetting compositions which are useful with the receptor of the present invention include curable and unsaturated polyester resins such as, for example, maleate resins formed by the reaction of various polyols and maleic anhydride. Orthophthalic resins may be used with receptors of the present invention and can be formed by reaction of phthalic anhydride and maleic anhydride or fumaric acid and as the dibasic acids. Isophthalic resins are also useful with receptors of the present invention and may be formed by preparing isophthalic acid and maleic anhydride or fumaric acid.

Receptors of the present invention may also be used with bis-phenol fumarides which may be prepared by the reaction of propyloxylated or ethoxylated bisphenol A with fumaric acid. Chlorendic polyester resins may also be used receptors of the present invention. Generally, chlorendic polyester resins are prepared by reacting chlorendic anhydride with maleic anhydride or fumaric acid. Vinyl esters may also be used with the receptors of the present invention as well as dicyclopentadiene resins.

Other exemplary thermosetting compositions useful in the present invention include the reaction product of orthotolyl biguanide known as casmine and commercially available from SBS Chemicals Inc. and the diglycidyl ether made from bis-phenol A-epichlorohydrin; triglycidyl isocyanurate thermosetting compositions; bis-phenol A-epichlorohydrin diglycidyl ether cured with phenolic crosslinking agents; aliphatic urethane thermosetting compositions such as an unblocked isofuron diisocyanate-E-caprolactam available from Ruco Polymer Corporation under the commercial name $NI_2$ which may be used with Ruco HBF which is a hydroxyl terminated polyester resin also available from Ruco Polymer Corporation; BTDA thermosetting compositions which are generally the reaction product of 3,3,4,4-benzophenone tetracarboxylic dianhydride and a bis-phenol A-epichlorohydrin diglycidyl ether; hybrid thermosetting compositions which are the reaction product of a carboxylated saturated polyester curing agents and bis-phenol A-epichlorohydrin diglycidyl ether; standard bis-phenol A-epichlorohydrin diglycidyl ether thermosets such as those which are cured from 2-methylimidazole; and standard bis-phenol A-eprchlorohydrin diglycidyl ether thermosets which are cured with 2-methylimidazole and dicyandiamide thermosetting compositions.

Curing agents known to those of skill in the art and which are also useful in the thermoset compositions of the present invention include melamines such as dialkyl melamines; amides such as dicyandiamide, adipamide, and isophthalyl diamide; ureas such as ethylene thiourea or guanylurea; azides such as thiosemicarbiazide, or adipyldihydrazide, and aophthalyl dihydradize; azoles such as guanazole, or 3 amino-1,2,4 triazole; and anilines such as dialkylanalines like dimethyl aniline or diethyl aniline.

Composites

The receptor compositions of the present invention may also be used in composites generally comprising thermoset compositions outlined above and insoluble filler compositions. Generally, the composite may comprise at least one fiber and a thermoset which is heat curable as well as an optional filler compatibly useful with that thermoset. Fiber component can be mono filament, multifilament fiber, yarn, woven fabric, non-woven fabric, and unidirectional multicomponent composite fibers. Generally, composite fibers that can be used in combination with thermosets and the receptor of the present invention to create a unitary object including metal fiber, polymeric or synthetic fiber, glass fibers, carbon fibers, or graphite fibers, useful for composite manufacture. Also useful are polyester mats, glass mats, carbon mats and graphite mats which may be woven or nonwoven as is intended for any given application.

Generally, in the fabrication of a composite, the concentration of the composite fiber will range from about 0.1 wt-% to about 99 wt-%, preferably from 5 wt-% to 40 wt-% and most preferably from about 10 wt-% to 20 wt-%.

Application of Radio Frequency Energy

Generally, the receptors of the present invention may be activated by any device capable of directing electromagnetic energy having a frequency ranging from about 1 megahertz to 100 megahertz (MHz) into the receptor. Radio waves within this frequency may be generated is through a modified Hartley Circuit, FIG. 1. A modified Hartley circuit 10 may generally comprise a frequency coil 12, tuning coil 14, oscillatory tube 16 and two opposing plates 18A and 18B. In use, the sample is generally positioned between these two plates, 18A and 18B, and the energy passes through the sample from the plate to opposing plate.

Figure 1:
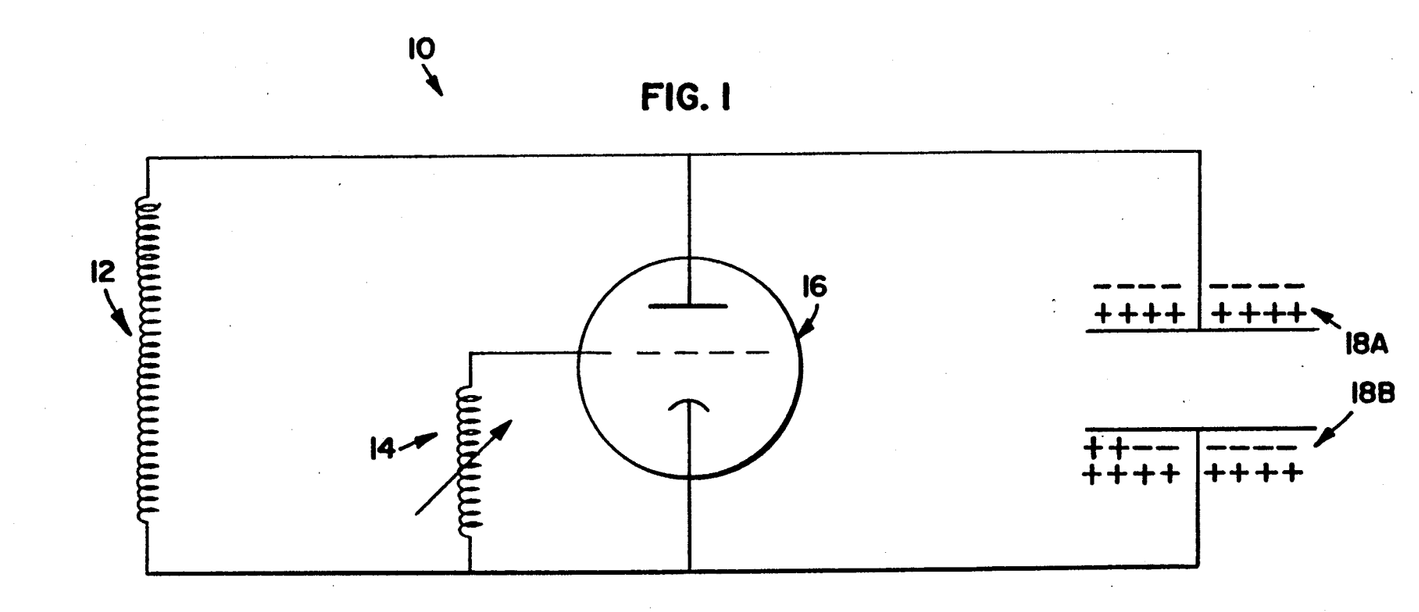
FIG. 1 is a schematic representation of a modified Hartley circuit.
Figure 2:
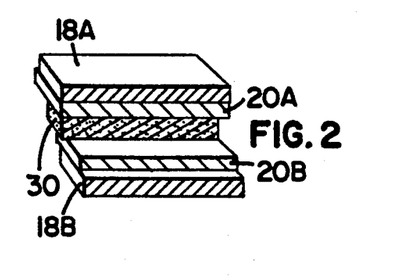
FIG. 2 is one embodiment of the method of the present invention depicting the application of radio frequency waves in a direction parallel to the receptor laden resin.

While a modified Hartley circuit 10 is possibly the most simple and well known circuit used for the creation of radio waves having the given frequency of 1 MHz to about 100 MHz, any other device capable of producing radio waves of this frequency may be used in accordance with the present invention. Generally, the receptors within a given thermoset resin may be activated by positioning the receptor containing resin 30 between two substrates 20A and 20B which are in turn positioned between two opposing plates or electrodes 18A and 18B, see FIG. 2. In noncomposite applications, the resin 30 may be laid on the substrate of application, which in turn may be positioned with the largest dimension of the adhesive 30 parallel to the opposing plates 18A and 18B, FIG. 2.

Figure 3:
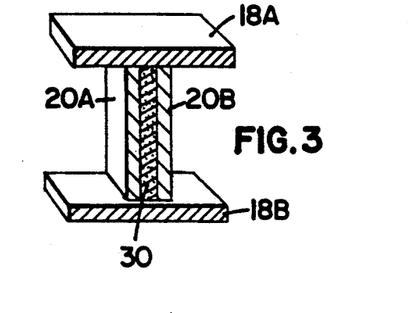
FIG. 3 is an alternative embodiment of the method of the present invention depicting application of radio frequency waves in a direction perpendicular to the orientation of the receptor laden resin.
Figure 4:
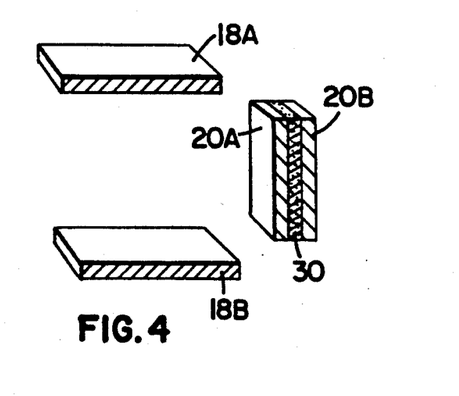
FIG. 4 is a further alternative embodiment of the method of the present invention depicting the application of radio frequency waves to the receptor laden resin through stray field waves.

The resin containing substrates 20A and 20B may also be positioned perpendicular to the opposing plates 18A and 18B, FIG. 3. The substrate 20A and 20B may also be positioned outside of the space between the opposing plates so as to be activated by radio waves which stray beyond the field created between the two plates, FIG. 4. This last application of energy is called stray field activation. In composite applications these three schemes are equally applicable to compositions held in molds by varying the position of the molds.

Figure 5:
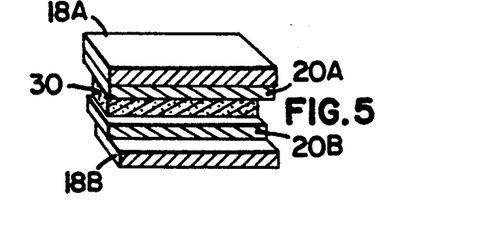
FIGS. 5, 6 and 7 depict various alternative embodiments of the application of radio frequency waves to the receptor laden resin stemming principally from the embodiment shown in FIG. 2.
Figure 6:
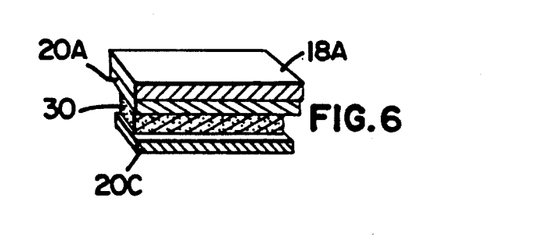
Figure 7:
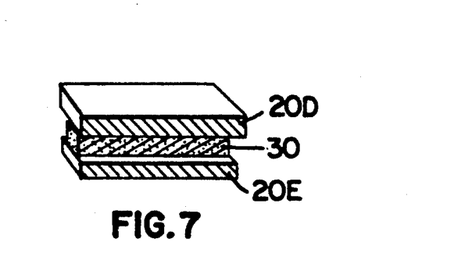

When the resin is placed within the field between the two opposing plates, various combinations of plates and substrates may be used in activating the receptors and, in turn, curing the thermoset compositions of the present invention, see FIGS. 5–7.

For example, as previously defined, the most simple means of activating receptors in accordance with the present invention is the use of a modified Hartley circuit 10 having conductive opposing plates. If the receptor laden thermoset 30 of the present invention is to be used as an adhesive, two opposing substrates 20A and 20B having the receptor resin 30 in between them may be inserted between the opposing plates 18A and 18B, FIG. 5. The plates, being conductive, act to effectively transmit energy waves through the substrates, activating the receptor. The adhesive 30 is heated and cured bonding the two substrates.

The present invention also provides for the use of a single conductive substrate or two conductive substrates to be used instead of the plates, see FIGS. 6 and 7. In these two instances, the conductive opposing plates are either partially or completely obviated. For example, it is possible to use conductive plate 18A in combination with two substrates 20A and 20C wherein substrate 20C is also conductive. The opposing lead for the radio frequency curing system is merely attached to the conductive substrate 20C so that energy will flow from the negatively charged plate through the receptor laden thermoset composition to the conductive substrate 20C. This process is reversed and repeated at the end of the electrical cycle and the beginning of the next cycle. Substrate 20C may be made conductive through application of embedded conductive foils, fibers, or particles. Conductive particles may also be applied by aerosol or pump spray. Alternatively, an inherently conductive substrate may be used such as a metal or metal alloy.

This design or method of applying radio frequency energy towards the curing of a thermoset composition is applicable in situations where a two plate system is not practical due to constraints created by logistic, space, or other considerations which prevent the inclusion of two opposing conductive plates. Such applications include the application of films to conductive substrates, such as automobiles, aircraft, and marine craft. The positive lead is merely attached to the substrate in which the receptor laden thermoset composition is to be applied so as to provide a proper energy ground so that the radio frequency energy will actually pass through the receptor laden thermoset composition which is laid against the first, oppositely positioned conductive plate.

The present invention also allows for the application of radio frequency energy to compositions which comprise two conductive substrates, FIG. 7. Here again, the substrates 20D and 20E may be the intended surface of application, such as in the case of a film or adhesive. Alternatively, the substrate may be a mold for the production of a composite article. For example, if an adhesive application is intended, two opposing substrates, 20D and 20E may be bonded to each other using those substrates as the conductive plates which would normally emit and receive the radio frequency energy. In this instance, the receptor laden thermoset 30 may generally applied to one of the substrates in the intended position. The other substrate is then placed approximately adjacent to this lower substrate in its intended position. Leads may then be attached to the respective substrates and energy is transmitted through the receptor laden thermoset composition. Composites may be similarly formed by using conductive molds.

The use of such conductive substrates may be found applicable in any number of industries including those which require metal to metal bonding or metal to dielectric bonding, where the dielectric may be wood, plastic, paper and the like. Such industries include the aerospace, marine and automotive industry in applications such as body panel applications, molded body panels, and the like; the aircraft industry in applications such as composite fuselage manufacture as well as interior structural applications and the like.

Generally, the receptors of the present invention may be activated by a frequency ranging from about 1 to 100, preferably from about 3 to 80, and most preferably from about 3 to 35 MHz. The most preferred frequency for operation of the receptors of the present invention is about 27.12 MHz. An additional advantage of the present invention is the ability to activate receptors without the use of high voltage electricity. Specifically, voltages ranging from about 1000 volts to 100,000 volts, preferably from about 1000 volts to about 50,000 volts, and most preferably from about 1000 volts to 10,000 volts may be used to activate the receptors of the present invention. The voltage may be varied depending on the amount of thickness of the material and the time of cure. However, the present invention allows cure at voltages as low as 1000 volts. Generally, the spacing of the radio wave generating plates ranges from about 0.001 inch to 20 inches, preferably 0.005 inch to 12 inches, and most preferably from 0.030 inch to 6 inches. In use, the radio waves are emitted with an amperage ranging from about 0.05 amp to 5 amps, preferably from about 0.1 amp to 1 amp, and most preferably from about 0.2 amp to 0.3 amp.

Generally, once receptors are loaded into the thermoset compositions of choice, the thermoset may be activated instantaneously merely by the application of energy having the correct frequency to that composition. The actual time of activation will depend upon the required heat to crosslink or cure the adhesive as well as the design of the plates used to provide the radio waves and the volume of thermoset composition to be cured. Generally, the time of application will range from about 0.01 to 60 minutes, preferably from about 0.1 to 15 minutes, and most preferably from about 0.1 to 6 minutes.

While a modified Hartley circuit may be used to complete the processes of the present invention, an especially preferred machine is a Workrite 300 made by Workrite Co. of Berkley, Calif. I have found that this machine is especially applicable to stray field applications providing 1000 volts and 300 watts.

APPLICATIONS

The receptors of the present invention may be used to cure a variety of thermoset compositions which may be used in any number of applications including the use as films, adhesives or in the manufacture of unitary composite articles. Generally, receptors can be used in thermoset compositions towards the production of plastic bonds, plastic to metal bonds, metal to metal bonds, wood to metal or plastic, and the like. The thermoset receptor compositions of the present invention may also be used for paper to paper, metal, and plastic for bonding of parts in the aerospace, marine, furniture, automotive, rail, appliance, construction, packaging, and general assembly markets.

Plastic substrates which may be adhered to by film coating or adhesion include polycarbonate substrates, acrylic substrates, polyvinyl chloride substrates, ABS substrates, polyolefins such as polypropylene substrates, polyethylene substrates, phenolic substrates, polyamide substrates, polyimide substrates, epoxy substrates, polysulfide and polysulfone substrates, polyester substrates, polyurethane substrates, and the like. Other substrates which the receptor laden thermoset compositions of the present invention may be used on include styrene, butadiene substrates, expanded polystyrene, nylon, fiberglass reinforced plastics including SMC and BMC and the like. By films it is intended that the receptor laden thermoset composition may be cast as a free standing film, or as a sealant which readily adheres to a substrate as well as other types of functional or aesthetic coating applications. These plastics may be coated or, in fact, bonded for the fabrication of parts used in any number of industries including the aerospace and aircraft industries, marine and recreational products industries, as well as the automotive, rail and truck industries.

Non-plastic substrates to which the receptor laden thermoset compositions may be applied include glass, wood, and metals such as aluminum, copper and brass alloys, lead, stainless steel, steel, tin, paper, galvanized steel, as well as plastic, metal alloys or thermoplastic elastomers, olefins, or polyesters.

WORKING EXAMPLES

The following examples illustrate the preparation of the receptor compositions of the present invention. These working examples should be viewed as illustrative and not as limiting of the present invention.

WORKING EXAMPLE I

Various phosphate receptors were tested for radio frequency activity in a stray environment. Specifically, 185 to 195 milliamps of radio frequency energy at a frequency of 27.12 MHz was applied and the temperature change was measured over the given period of time. Below are listed Working Examples 1A through 1K.

Example 1A:   3 gm Pentaerythritol/No heat rise.
Example 1B:   3 gm of Calcium Carbonate/No response.
Example 1C:   2.5 grams of Tri (Beta Chloropropyl) Phosphate.
  Temp. Change            Time -continued

| | |
|---|---|
| RT-224F | 1 min 55 sec |

Example 1D: Tributyl phosphate.

| Temp. Change | Time |
|---|---|
| RT-100F | 120 sec. |

Example 1E: Tri (Beta, Beta Dichloroisopropyl) Phosphate

| Temp. Change | Time |
|---|---|
| RT-151F | 18 sec |
| RT-151F | 19 sec |
| RT-224.4F | 49 sec |

Example 1F: Propylated triphenyl phosphate

| Temp. Change | Time |
|---|---|
| RT-151F | 29 sec |
| RT-224.4F | 181 sec |

Example 1G: Butylated triphenyl phosphate

| Temp. Change | Time |
|---|---|
| RT-151F | 31 sec |
| RT-151F | 55 sec |
| RT-224F | 92 sec |
| RT-224F | 107 sec |

Example 1H: Tricresyl Phosphate.

| Temp. Change | Time |
|---|---|
| RT-151F | 28 sec |
| RT-151F | 29 sec |
| RT-224F | 82 sec |
| RT-224F | 92 sec |

Example 1I: Dimethyl Methyl Phosphonate.

| Temp. Change | Time |
|---|---|
| RT-151F | 21 sec |
| RT-151F | 22 sec |
| RT-224F | 26 sec |
| RT-224F | 29 sec |

Example 1J: Diether N,N-Bis (2-hydroxy ethyl) amino methyl phosphonate.

| Temp. Change | Time |
|---|---|
| RT-151F | 3 sec |
| RT-202F | 6 sec |

Example 1K: Tri (Beta Chloro Ethyl) Phosphate.

| Temp. Change | Time |
|---|---|
| RT-151F | 59 sec |
| RT-224F | 102 sec |

WORKING EXAMPLE II

A receptor composition comprising 20% solid quarternary salt and 80% dimethyl methyl phosphonate was then formulated in a 250 milliliter beaker by introducing a quarternary salt first and then adding the dimethyl methyl phosphate with a stirrer at 150° F. Once this composition was dissolved it was cooled and placed in a glass jar. The composition was then tested for RF sensitivity by applying 215 milliamps through a stray field to the composition for 0 to 5 seconds. As can be seen below, the temperature change over that time period for each of five samples range as high as 353° F. from the initial room temperature for each of the five samples.

| | Wt % | Grams | |
|---|---|---|---|
| 1. Ca-100 | 20 | 8.1 | $CH_3CH_2N(CH_3)_2(C_{12-14}$ alkyl) |
| 2. DMMP | 80 | 32.4 | Dimethyl methyl phosphonate |
| | 100 | 40.5 | |

| Example | Temp. Change | Time |
|---|---|---|
| 2A | RT-224.4° F. | 3 sec |
| 2B | RT-299.3° F. | 2.4 sec |
| 2C | RT-353.3° F. | 1.7 sec |
| 2D | RT-353.1° F. | 4.1 sec |
| 2E | RT-353.1° F. | 2.6 sec |

WORKING EXAMPLE III

Using the receptor formulated in Working Example II, a thermoset receptor composition was then formulated by mixing 28.8 grams (96 wt-%) of Corez 75AA-0155 (55% w/v) isophthalic unsaturated polyester resin diluted in styrene) was mixed with 0.613 grams of the receptor formulated in Example II and 0.60 grams of methyl ethyl ketone peroxide. Once this composition was completely formulated, it was subjected to radio frequency waves at 180 milliamps for 60 second during which time the temperature in the composition rose from room temperature to 224° F. ultimately resulting in a cured composition. The peroxide used in this example was a methyl ethyl ketone peroxide.

WORKING EXAMPLE IV

Thermoset compositions containing various receptors in accordance with the present invention were then formulated. Various concentrations of urethane resin single part urethane known as UR 1100 available from H. B. Fuller Company) was mixed at concentrations ranging from 95 to 98% with various receptors as outlined below.

| Example | wt % Urethane | Receptor/wt % |
|---|---|---|
| 4A | 98 wt % | (20% Quat* & 80% butanediol)/ 2 wt % |
| 4B | 95 wt % | Aluminum trihydrate/5 wt % |
| 4C | 96 wt % | Phosphonate**/4 wt % |
| 4D | 98 wt % | Polystyrene sulfonate Na salt/2 wt % |
| 4E | 98 wt % | (20% Quat 80% & Phosphate**)/ 2 wt % |
| 4F | 96 Wt % | $CaSO_4$/4 wt % |

*Quat is $CH_3CH_2N(CH_3)_2(C_{12-14}$ alkyl)
**Phosphonate is dimethyl methyl phosphonate These compositions were then cured using a radio frequency of 27.12 MHz in a stray field techniques at 175 to 195 milliamps over times ranging from 30 second to three minutes.

WORKING EXAMPLE V

Two adhesive compositions were then formulated using two component urethanes. Specifically, a two component urethane adhesive was formulated using a caprilactonepolyol composition (UR 4510A available from H. B. Fuller Co.) and methane diisocyanate prepolymer composition (UR 4510B available from H. B. Fuller Co. Mixed in to each of these compositions was a receptor of various concentrations as can be seen in the table provided below.

| Example | Polyol | Diisocyanate | wt % (Receptor) |
|---|---|---|---|
| 5A | 49.5 wt % | 49.0 wt % | 1.5 wt % (80 wt % 1,4-butanediol and 20 wt % Quat*) |
| 5B | 45.0 wt % | 50.0 wt % | 5.0 wt % (Aluminum trihydrate) |

*$CH_3CH_2N(CH_3)_2(C_{12-14}$ alkyl)

Under conditions similar to those provided under Working Example IV, the adhesive compositions of Working Example 5A and 5B cured to a hardened structural bond.

WORKING EXAMPLE VI

Two urethane coating compositions were then formulated using a two component system comprising an aromatic polymeric isocyanate (SN 2013B available from H. B. Fuller Co.) and a glyceride based carboxylic acid prepolymer (SN 3012A also available form H. B. Fuller Co.). Receptors were added to each of the compositions at weight percentages detailed below.

| Example | Polyol | Isocyanate | wt % (Receptor) |
|---|---|---|---|
| 6A | 64 wt % | 34 wt % | 2 wt % (80 wt % 1,4-butanediol 20 wt % Quat*) |
| 6B | 64 wt % | 34 wt % | 2 wt % (50 wt % dimethyl methyl phosphate, 40 wt % 1,4 butanediol, and 20 wt % Quat*) |

*$CH_3CH_2N(CH_3)_2(C_{12-14}$ alkyl)

Upon curing under conditions similar to those of Example IV, all of the coatings is formed cured, hardened compositions.

WORKING EXAMPLE VII

One component epoxy adhesives were then formulated using the receptor compositions of the present invention. Specifically, in 95 to 98% of a diicyandiamide initiated epichlorohydrin polyol epoxy (WC 2291 available from H. B. Fuller Automotive Products Co.) combined with 2 to 5% receptor.

| Example | Epoxy wt % | wt % (Receptor) |
|---|---|---|
| 7A | 98 | 2 wt % (20 wt % Quat* and 80 wt % dimethyl methyl phosphonate) |
| 7B | 98 | 2 wt % (20 wt % Quat* 80 wt % 1,4 butanediol) |
| 7C | 95 | 5 wt % (Aluminum trihydrate) |
| 7D | 95 | 5 wt % $CaSO_4$ |
| 7E | 96 | 4 wt % (Polystyrene sulfonate Na salt) |

*$CH_3CH_2N(CH_3)_2(C_{12-14}$ alkyl)

Upon curing, all Examples provided hardened structural bonds.

WORKING EXAMPLE VIII

A two component epoxy adhesive was formulated using a epichlorohydrin/bis phenol A resin (FE 6026A available from H. B. Fuller Co.) and an amine resin (FE 6026B available from H. B. Fuller Co.) along with a receptor.

The relevant compositional concentrations can be found below.

| Ex. | Epichlorohydrin/ Bis phenol-A (wt %) | Amine Resin (wt %) | wt % (Receptor) |
|---|---|---|---|
| 8A | 49.0 | 49.0 | 2 wt % (2- wt % Quat*) (80 wt % 1,4 butanediol) |
| 8B | 49.0 | 49.0 | 2 wt % (50 wt % Quat*) (50 wt % Phosphonate) |
| 8C | 47.5 | 47.5 | 5 wt % (Aluminum trihydrate) |
| 8C | 47.0 | 47.0 | 6 wt % Polystyrene sulfonate sodium salt |

*$CH_3CH_2N(CH_3)_2(C_{12-14}$ alkyl)
**(Dimethyl methyl phosphonate)

Under the conditions similar to those of Working Example IV, the two component epoxies formed cured structural bonds.

WORKING EXAMPLE IX

A control working example was then prepared using 99% (7.7 grams vinyl ester) (Corez 75 AA-0155 isophthalic unsaturated polyester resin (55% w/v) diluted in styrene, and a methyl ethyl ketone peroxide (1 wt-% 0.078 grams) were mixed within a polyethylene cup. The methyl ethyl ketone peroxide was added dropwise and mixed thoroughly with a spatula.

Three grams of the composition were then poured onto the bottom of an inverted cup having the approximate diameter of 1½ inches. The inverted cup was then placed on a wood block underneath an RF generator electrodes and a 500 milliliter polyethylene cup was placed over the inverted cup and wood block. The RF generator was then activated at a frequency of 27.12 MHz at 260 milliamps after 60 seconds 3 grams of the mixed composition has a temperature of 106° F. using open electrodes. While the surface of the composition was slightly tacky, there was not extended curing.

Using closed electrodes on a second sample of the same composition, the composition measured 90° F. after 60 seconds at 260 milliamps. A third trial using open electrodes resulted in 103° F. reading in a three gram sample after 60 seconds on 260 milliamps.

WORKING EXAMPLE X

Testing was then undertaken to determine the sensitivity of certain RF receptors. The first composition was formulated by mixing 20 wt-% quarternary ammonium salt ($CH_3CH_2N(CH_3)_2(C_{12-14}$ alkyl)Cl) and 80 wt-% 1, 4 butanediol. When a 2.5 gram sample of this mixture was subjected to 215 milliamps of RF frequency at 27.12 Mghz, the sample increased in temperature from room temperature to 151° F. in 6.4 seconds. A second sample was subjected to 295 milliamps at 27.12 Mghz and after 23 seconds, the temperature increased from room temperature to 252° F.

WORKING EXAMPLE XI

A second mixture of 20 wt-% of quarternary ammonium salt ($CH_3CH_2N(CH_3)_2(C_{12-14}$ alkyl)Cl) and 80% 1,4 butanediol were mixed. 2.5 gram samples were then subjected to an RF energy at varying milliamp ranges and 27.12 MHz frequency. At times ranging from 5 seconds to 20 seconds, the samples increased in temperature from room temperature to 328° F. The receptor compositions of Working Example X seemed to generate less heat than those of Working Example XI.

WORKING EXAMPLE XII

Four sets of polyester resins were then prepared generally comprising the isophthalic unsaturated resin (55% w/v) diluted in styrene (Corez 75AA-015S) and a methyl ethyl ketone peroxide. The composition was then split in to four portions. Designated Working Examples 12A, 12B, 12C and 12D. Example 13A was retained as a control and no RF receptor was added to that composition. Working Examples 12B, 12C and 12D all had RF receptors added to them. The control composition was then cured for 24 hours at room temperature. Once cured, the control composition (Working Example 12A) was post baked at 8 hours at 150° F. and then demolded. Working Example 12B was similarly cured for 24 hours at room temperature and then post baked for eight hours at 150° F. before demolding. Both Working Examples 12C and 12D were cured for three minutes at 5 Mghz radio frequency. However, Working Example 12C was demolded immediately and then left to cure for 48 hours at room temperature prior to testing. Meanwhile, Working Example 12D was cured for 48 hours at room temperature before demolding.

Listed in the table below are the relative working example constituent concentrations as well as tensile strength and elongation percentages during testing. There was no substantial difference among any of Examples 12A through 12D.

| Example 12A (control): | | | |
|---|---|---|---|
| Polyester resin | 98.5% | Tensile: | 6,965 PSI |
| Peroxide | 1.5% | Elongation: | 5.75% |
| Example 12B: | | | |
| Polyester resin | 97.0% | Tensile: | 6,875 PSI |
| Peroxide | 1.5% | Elongation: | 6.53% |
| RF additive | 1.5% | | |
| Example 12C: | | | |
| Polyester resin | 96.5% | Tensile: | 6,320 PSI |
| Peroxide | 1.5% | Elongation: | 4.20% |
| RF additive | 3.0% | | |
| Example 12D: | | | |
| Polyester resin | 96.5% | Tensile: | 6,821 PSI |
| Peroxide | 1.5% | Elongation: | 4.73% |
| RF additive | 3.0% | | |

WORKING EXAMPLE XIII

A series of Working Examples were then undertaken using various formulations of polyester resin, in various molds. Generally, these molds were used toward the formation of composite articles. Table 1, seen below, shows the Working Example, mold type as well as the weight and composition of the resin which was processed. Table 2 discloses the processing conditions used for each working example. A description of the molds, compositions, sensitizers, etc. may be found in the footnotes to the tables.

TABLE 1

| Example | Weight (Grams) | Electrode Design | Material Formula | Methyl Ethyl Ketone Peroxide Catalyst (wt %) | Sensitizer (wt %) |
|---|---|---|---|---|---|
| 13A | 0 | Dogbone[1] | Air | 0 | 0 |
| 13B | 5 | Dogbone | Nylon Fixture Bolt | 0 | 0 |
| 13C | 2 | Dogbone | Wet Towel | 0 | 0 |
| 13D | 18 | Match Metal | Isophthalic Resin | 1.5 | 1.5/CABTD[4] |
| 13E | 18 | Match Metal | Isophthalic Resin | 2.0 | 2.0/CPU14BTD[5] |
| 13F | 18 | Match Metal | Isophthalic Resin | 2.0 | 2.0/CPU14BTD |
| 13G | 18 | Match Metal | Isophthalic Resin | 2.0 | 2.0/CPU14BTD |
| 13H | 18 | Match Metal | Isophthalic Resin | 4.0 | 2.0/CPU14BTD |
| 13I | 18 | Match Metal | Isophthalic Resin | 2.0 | 3.0/CABTD |
| 13J | 18 | Match Metal | Isophthalic Resin | 2.0 | 3.0/CABTD |
| 13K | 18 | Match Metal | Isophthalic Resin | 3.0 | 3.0/CABT |
| 13L | 18 | Match Metal | Isophthalic Resin | 3.0 | 3.0/CG/EG[6] |
| 13M | 18 | Match Metal | Idophthalic Resin | 1.5 | 1.0/CAMP40[7] |
| 13N | 18 | Match Metal | Isophthalic Resin | 1.5 | 2.0/CAMP40 |
| 13P | 18 | Match Metal | Isophthalic Resin | 1.5 | 4.0/CAMP40 |
| 13Q | 24 | Flat Panel[8] | Isophthalic Resin | 1.5 | 4.0/CAMP40 |
| 13R | 250 | Flat Panel | Isophthalic Resin | 4.0 | 4.0/CPU14BTD |
| 13S | 250 | Flat Panel | Isophthalic Resin | 4.0 | 4.0/CPU14BTD |
| 13T | 275 | Flat Panel | Isophthalic Resin | 4.0 | 4.0/CABTD |
| 13U | 275 | Flat Panel | Isophthalic Resin | 4.0 | 4.0/CABTD |
| 13V | 275 | Flat Panel | Polyester Resin[9] | 4.0 | 4.0/CA—AR[10] |
| 13W | 275 | Flat Panel | Polyester Resin | 4.0 | 4.0/CA—AR |
| 13X | 275 | Flat Panel | Polyester Resin | 4.0 | 4.0/CA—AR |
| 13Y | 275 | Flat Panel | Polyester Resin | 4.0 | 4.0/CA—AR |
| 13Z | 275 | Flat Panel | Polyester Resin | 4.0 | 4.0/CA—AR |
| 13A' | 275 | Flat Panel | Polyester Resin | 4.0 | 4.0/CA—AR |
| 13B' | 275 | Flat Panel | Polyester Resin | 4.0 | 4.0/CA—AR |
| 13C' | 275 | Flat Panel | Polyester Resin | 4.0 | 4.0/CA—AR |
| 13D' | 25 | Match Metal | Polyester Resin | 4.0 | 4.0/CA—AR |
| 13E' | 25 | Match Metal | Polyester Resin | 4.0 | 4.0/CA—AR |
| 13F' | 25 | Match Metal | Polyester Resin | 4.0 | 4.0/CA-AR |
| 13G' | 35 | Match Metal | Polyester Resin | 2.0 | 4.0/CA—AR |
| 13H' | 35 | Match Metal | Polyester Resin | 2.0 | 6.0/CA—AR |
| 13I' | 35 | Match Metal | Polyester Resin | 1.3 | 6.0/CA—AR |
| 13J' | 35 | Match Metal | Polyester Resin | 4.0 | 6.0/CA—AR |
| 13K' | 35 | Match Metal | Polyester Resin | 2.0 | 6.0/CA—AR |
| 13L' | 35 | Match Metal | Polyester Resin | 2.0 | 6.0/CA—AR |

TABLE 1-continued

| Example | Weight (Grams) | Electrode Design | Material Formula | Methyl Ethyl Ketone Peroxide Catalyst (wt %) | Sensitizer (wt %) |
|---|---|---|---|---|---|
| 13M' | 35 | Match Metal | Polyester Resin | 2.0 | 6.0/CA—AR |

[1] Dogbone Mold with ¼" + ¼" + ¼" Teflon
[2] N.E. Mold with 1/16" Teflon Spacer
[3] Unsaturated isophthalic polyester resin (55% resin (w/v); 45% styrene (w/v) available from Interplastics of Minnesota)
[4] CABTD is 1,4 Butanediol (80 wt-%) and $CH_3CH_2N^+(CH_3)_2(C_{12-14}$ alkyl) (20 wt-%)
[5] CPU14BTD is $(CH_3CH_2N(CH_3)_2(C_{12-14}$ alkyl) (20 wt-%); 1,4 Butanediol (80 wt-%))
[6] CG/EG is $(CH_3CH_2N(CH_3)_2$ $(C_{12-14}$ alkyl) (80 wt-%); Ethylene Glycol (80 wt-%))
[7] CAMP40 is $(CH_3CH_2N(CH_3)_2(C_{12-14}$ alkyl)
[8] 10 × 10 Polyester Mold with 1/8" Teflon
[9] Polyester resin is calcium carbonate filled unsaturated polyester resin from Ashland Chemical Co. as Arotran 50437
[10] CA—AR is $(CH_3CH_2N(CH_3)_2(C_{12-14}$ alkyl) solubilized in 80 wt-% Arotran 50437

TABLE 2

| Example | Frequency (MHz) | Time (Seconds) |
|---|---|---|
| 13A | 22.45 | 180 |
| 13B | 43.10 | 180 |
| 13C | 42.10 | 3 |
| 13D | 26.76 | 120 |
| 13E | 27.69 | 180 |
| 13F | 27.69 | 120 |
| 13G | 27.618 | 240 |
| 13H | 27.35 | 240 |
| 13I | 42.10 | 120 |
| 13J | 44.50 | 120 |
| 13K | 45.10 | 120 |
| 13L | 42.39 | 120 |
| 13M | 39.50 | 120 |
| 13N | 40.50 | 120 |
| 13O | 40.50 | 180 |
| 13P | 41.90 | 180 |
| 13Q | 27.35 | 240 |
| 13R | 26.44 | 120 |
| 13S | 54.60 | 120 |
| 13T | 49.87 | 480 |
| 13U | 24.96 | 240 |
| 13V | 28.01 | 240 |
| 13W | 21.70 | 240 |
| 13X | 40.80 | 240 |
| 13Y | 29.47 | 120 |
| 13Z | 25.45 | 120 |
| 13A' | 30.70 | 120 |
| 13B' | 24.70 | 360 |
| 13C' | 47.36 | 300 |
| 13D' | 26.87 | 180 |
| 13E' | 25.04 | 120 |
| 13F' | 25.60 | 240 |
| 13G' | 26.45 | 240 |
| 13H' | 21.00 | 240 |
| 13I' | 25.20 | 240 |
| 13J' | 25.68 | 240 |
| 13K' | 24.60 | 240 |
| 13L' | 25.40 | 300 |
| 13M' | 25.58 | 240 |

The foregoing specification, examples and data provide a basis for understanding the invention. The invention can be made in a variety of embodiments without departing form the spirit and scope of the invention. Accordingly, the invention resides in the claims hereinafter appended.

I claim as my invention:

1. A method of forming a cured thermoset composition by applying radio signals having a frequency of about 1 to 100 MHz to a composition comprising a major portion of thermoset and a receptor, said receptor having a dissipation factor of about 0.1 or greater and a dielectric constant of at least 0.1 or greater, said receptor selected from the group consisting of alkali or alkaline earth metal sulfate salts, aluminum trihydrate, quaternary ammonium salts, phosphonate compounds, phosphate compounds, polystyrene sulfonate sodium salts, or mixtures thereof, said method comprising the steps of:
   (a) applying said composition to a substrate;
   (b) applying radio signals to the composition deposited on the substrate; and
   (c) dissipating the radio signals received by the receptor as thermal energy in an amount effective to cure the composition to a thermoset bond.

2. The method of claim 1 additionally comprising the step of applying a second substrate on top of the heat curable composition prior to the application of radio signals to the composition.

3. The method of claim 1 wherein said substrate comprises wood, metal, glass, plastic, or paper.

4. The method of claim 2 wherein said first or second substrates comprise a composition selected from the group consisting of wood, metal, glass, plastic or paper.

5. The method of claim 1 wherein said radio signals are applied to said heat curable composition for a period of time ranging from about 0.1 minute to about 60 minutes.

6. The method of claim 1 wherein said radio waves are applied to the composition through a conductive substrate.

7. The method of claim 2 wherein said first and second substrates are conductive and said radio waves are applied directly to the composition through said conductive substrates.

8. The method of claim 1 wherein said radio signals have a frequency ranging from about 3 to 35 MHz.

9. The method of claim 8 wherein said radio signals have a frequency of about 27.1 MHz.

10. The method of claim 1 wherein said radio signals are produced at a voltage ranging from about 1,000 volts to about 50,000 volts.

11. The method of claim 10 wherein said radio signals are produced at a voltage ranging from about 1,000 volts to 10,000 volts.

12. The method of claim 1 wherein said radio signals are produced by two parallel plates, said plates having a spacing ranging from about 0.001 inch to 20 inches.

13. The method of claim 12 wherein said plates have a spacing ranging from about 0.030 inch to 6 inches.

14. The method of claim 1 wherein said radio waves are emitted at an average current ranging from about 0.05 amps to 5 amps.

15. The method of claim 14 wherein said radio waves are emitted with an average ranging from about 0.2 amps to 0.3 amps.

16. A method of forming a cured thermoset composition by applying radio signals having a frequency of about 3 to 35 MHz at a voltage ranging from about 1000 to 50,000 volts and an average current ranging from about 0.05 amps to 5 amps to a composition comprising a major portion of thermoset and a receptor, said receptor having a dissipation factor of about 0.1 or greater and dielectric constant of at least 0.1 or greater, said receptor selected from the group consisting of alkali or alkaline earth metal sulfate salts, aluminum trihydrate, quaternary ammonium salts, phosphonate compounds, phosphate compounds, polystyrene sulfonate sodium salts, or mixtures thereof, said method comprising the steps of:

(a) applying said composition to a substrate;
(b) placing the substrate between two plates and applying radio signals to the composition deposited on the substrate; and
(c) dissipating the radio signals received by the receptor as thermal energy in an amount effective to cure the said composition to a thermoset bond.

17. The method of claim 16 wherein said substrate comprises wood, metal, glass, plastic, or paper.

18. The method of claim 16 wherein said first or second substrates comprise a composition selected from the group consisting of wood, metal, glass, plastic or paper.

19. The method of claim 16 wherein said radio signals are applied to said heat curable composition for a period of time ranging from about 0.1 minute to about 60 minutes.

20. The method of claim 16 wherein said radio waves are applied to the composition through a conductive substrate.

21. The method of claim 16 wherein said first and second substrate are conductive and said radio waves are applied directly to the composition through said conductive substrates.

* * * * *